United States Patent
Seupel

(10) Patent No.: US 8,319,890 B2
(45) Date of Patent: Nov. 27, 2012

(54) ARRANGEMENT FOR GENERATING A 3:2 PULL-DOWN SWITCH-OFF SIGNAL FOR A VIDEO COMPRESSION ENCODER

(75) Inventor: Olaf Seupel, Pinnow (DE)

(73) Assignee: Entropic Communications, Inc., San Diego, CA (US)

( * ) Notice: Subject to any disclaimer, the term of this patent is extended or adjusted under 35 U.S.C. 154(b) by 1293 days.

(21) Appl. No.: 10/585,200

(22) PCT Filed: Dec. 20, 2004

(86) PCT No.: PCT/IB2004/052860

§ 371 (c)(1),
(2), (4) Date: Apr. 24, 2007

(87) PCT Pub. No.: WO2005/076611

PCT Pub. Date: Aug. 18, 2005

(65) Prior Publication Data

US 2007/0285564 A1     Dec. 13, 2007

(30) Foreign Application Priority Data

Jan. 9, 2004  (EP) ................... 04100052

(51) Int. Cl.
*H04N 7/01* (2006.01)
*H04N 11/20* (2006.01)

(52) U.S. Cl. ..................................... 348/443
(58) Field of Classification Search ............... 348/443
See application file for complete search history.

(56) References Cited

U.S. PATENT DOCUMENTS

| 5,452,011 A | 9/1995 | Martin et al. |
| 5,461,420 A | 10/1995 | Yonemitsu et al. |
| 5,734,420 A | 3/1998 | Lee et al. |

(Continued)

FOREIGN PATENT DOCUMENTS

CN      1221288 A      6/1999

(Continued)

OTHER PUBLICATIONS

CN1221288 corresponds to U.S. Patent No. 5,461,420.
CN1330464 corresponds to U.S. Patent No. 6,839,089.
JP7264548 corresponds to US Patent No. 5,452,011 and EP Publication No. 0673169.

(Continued)

*Primary Examiner* — David Czekaj
*Assistant Examiner* — Chikaodili E Anyikire

(57) ABSTRACT

Arrangement for generating a pull-down switch-off signal The invention relates to an arrangement (1) for generating a pulldown switch-off signal for a video compression encoder, which signal is determined by the arrangement (1) in dependence on a converted signal which is produced from an NTSC signal by means of an inverse 3:2 pull down conversion, wherein the circuit arrangement includes a M(ean) A(bsolute) D(istortion) (MAD) detector (2) and a circuit (3) for determining Hadamard coefficients, wherein the MAD detector (2) produces a MAD signal which indicates for each block of predefined size the difference between the picture contents of two consecutive frames, wherein the circuit (3) for determining the Hadamard coefficients delivers two coefficients in blocks per frame, from which coefficients a first coefficient indicates the sum of the differences of the pixels of adjacent scanning lines i and i+1 and a second coefficient indicates the sum of the differences of the pixels of scanning lines i and i+2, and wherein the pull-down switch-off signal is generated in dependence on the summed values of the MAD signal for all blocks of a frame and in dependence on the two Hadamard coefficients summed for all the blocks of a frame.

16 Claims, 2 Drawing Sheets

U.S. PATENT DOCUMENTS

Figure 1:
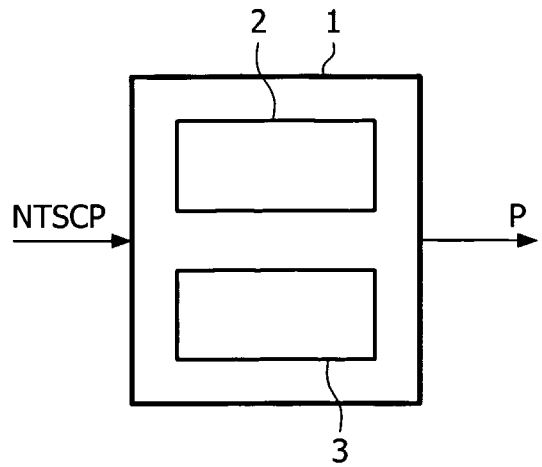

| | | | |
|---|---|---|---|
| 5,923,784 A | 7/1999 | Rao et al. | |
| 6,839,089 B2 | 1/2005 | Fakhruddin | |
| 2002/0101924 A1* | 8/2002 | Suzuki et al. | 375/240.2 |
| 2004/0257476 A1* | 12/2004 | Song et al. | 348/700 |

FOREIGN PATENT DOCUMENTS

| | | |
|---|---|---|
| CN | 1330464 A | 1/2002 |
| EP | 0 673 169 A2 | 9/1995 |
| JP | 7264548 A | 10/1995 |

OTHER PUBLICATIONS

Mitchell, et al., "MPEG Video Compression Standard", Chapman and Hall (1996).

Mitchell, Joan L. et al., "MPEG Video Compression Standard", http://books.google.de/books?id=f6Cuz9Tig-MC& printsec= front cover&dq=Mitchell+"MPEG+Video+Compressic#v=onepage&q& f=false.

* cited by examiner

ARRANGEMENT FOR GENERATING A 3:2 PULL-DOWN SWITCH-OFF SIGNAL FOR A VIDEO COMPRESSION ENCODER

RELATED APPLICATIONS

This application claims the priority benefits of PCT International Application PCT/IB2004/052860, filed Dec. 20, 2004, which claims priority to European Patent Application No. 04100052.2, filed Jan. 9, 2004.

The invention relates to an arrangement for generating a pull-down switch-off signal, which signal is determined for a video compression encoder which may be, for example, an MPEG2 encoder. The arrangement then produces this pull-down switch-off signal in dependence on a converted signal which is produced from an NTSC signal by means of an inverse 3:2 pull-down conversion.

A what is called 3:2 pull-down conversion is applied to such NTSC signals that have emerged from the scanning of a film which is scanned with 24 frames per second. This scanning signal is then to be converted into an NTSC video signal with 60 fields per second. If each scanned frame were then to be used for generating two fields, only 48 fields per second would evolve. Therefore, frames are alternately scanned three times in order to generate 3 equal fields. For the result this means that the frames of the film are scanned in a 3:2:3:2 cycle etc., so that the 24 frames become 60 fields of the video signal per second.

For example for DVD recorders, but also for recording such video signals on hard disks or for digital transmission of said video signals, it is desired to subject such an NTSC video signal coming from a 3:2 pull-down conversion to a video compression, for example an MPEG2 compression. Since the data rate is always critical for such video compressions, there is a desire to avoid as much as possible that the same fields are scanned twice. Just this is possible in principle in an NTSC signal that was subjected to a 3:2 pull-down conversion, because fields that need to be scanned and compressed only once are available double here. This could lead to a reduction of about 20% of the video data for the video compression, so that the bit rate could be increased accordingly.

From the state of the art solutions are known which therefore subject the NTSC signal, which has arisen from a 3:2 pull-down conversion of a film scanning, to a what-is-called inverse 3:2 pull-down conversion. The fields that have the same content, which have arisen from the double scanning of the same frame, are then again rejected. A video stream evolves which contains frames whose fields have all arisen from the scanning of different pictures of the film from which the NTSC signal has emerged.

The problem of such known arrangements consists of the fact that the application of the inverse 3:2 pull-down conversion to the NTSC signal then leads to considerable errors in the representation, more particularly representation of motion when the NTSC signal, which is subjected to the inverse 3:2 pull-down conversion, has not or has no longer emerged from a film scanning with 24 frames per second, but, when it is a normal video signal, which contains 60 different fields, contains various motion phases per second. If the inverse 3:2 pull-down conversion is further applied to such a signal, fields are rejected that actually have new picture content and content different from the other fields. Particularly with motion there are distinct errors in the signal.

Therefore, it is an object of the invention to provide an arrangement for generating a pull-down switch-off signal which detects in as reliable and fast a manner when the NTSC signal applied to the arrangement, which NTSC signal was subjected to an inverse 3:2 pull-down conversion, was not generated or no longer generated by scanning a film with 24 frames per second and applying the 3:2 pull-down technique.

This object is achieved according to the invention by the features defined in patent claim 1:

An arrangement for generating a pull-down switch-off signal for a video compression encoder, which signal is determined by the arrangement in dependence on a converted signal which is produced from an NTSC signal by means of an inverse 3:2 pull-down conversion, wherein the circuit arrangement includes a Mean Absolute Distortion (MAD) detector and a circuit for determining Hadamard coefficients, wherein the MAD detector produces a MAD signal which indicates for each block of predefined size the difference between the picture contents of two consecutive frames, wherein the circuit for determining the Hadamard coefficients delivers two coefficients in blocks per frame, from which coefficients a first coefficient indicates the sum of the differences of the pixels of adjacent scanning lines i and i+1 and a second coefficient indicates the sum of the differences of the pixels of scanning lines i and i+2, and wherein the pull-down switch-off signal is generated in dependence on the values of the MAD signal summed for all the blocks of a frame and in dependence on the two Hadamard coefficients summed for all the blocks of a frame.

The arrangement according to the invention is configured such that it is in a position to detect extremely fast and reliably from the signal generated from an NTSC signal by means of an inverse 3:2 pull-down conversion, when the NTSC signal has actually emerged from the scanning of 60 fields per second and no longer from the scanning of 24 frames per second of a film and successive application of a 3:2 pull-down conversion.

For the reasons described above it is desirable for the arrangement to detect this transition in an extremely fast and reliable manner. For this purpose, on the one hand a what-is-called MAD detector as is customarily present in MPEG encoders is provided in the circuit arrangement. Such MAD detectors, where MAD stands for Mean Absolute Distortion, are generally used for estimating motion. Consecutive frames are then compared in blocks and it is then determined how much picture content per block has changed from one frame to the next.

The arrangement according to the invention further includes a circuit for determining Hadamard coefficients. Two coefficients per block are then generated for each frame. A first Hadamard coefficient sums in blocks the differences of the pixels of adjacent scanning lines i and i+1 within the block. For generating a second Hadamard coefficient, also the sum of the differences of pixels within the block is determined, but of pixels of the scanning lines i and i+2, thus every second scanning line. In this way the Hadamard coefficients represent in proportion to each other a measure that expresses whether picture content of adjoining scanning lines or of the adjacent-but-one scanning lines differs from each other. This may be considered a measure whether the frame has arisen by scanning individual, different fields, or whether the frame has arisen from scanning a frame with a motion phase as this is the case, for example, for film scanning. The calculation of the Hadamard coefficients as such is known from "MPEG Video Compression Standard, Mitchell, Pennebaker, Fogg and LeGall, published by Chapman and Hall, 1996.

Both the values of the MAD signal generated in blocks, and the first and second Hadamard coefficients generated in blocks are summed for I frame.

Within the context discussed above the arrangement can directly deduce from these sums whether the signal subjected to an inverse 3:2 pull-down conversion is or is not the result of film scanning with 24 frames and successive 3:2 conversion. This criterion can particularly be generated based on the Hadamard coefficients. The MAD signal additionally provides a kind of scene detection, because the MAD values rise considerably with changing scenes. Similarly also holds true when the pull-down cycle was distorted during the generation of the NTSC signal, or when this signal was later subjected to a cut, so that the 3:2 pull-down cycle in the NTSC signal is no longer available free of distortion. In all these cases the arrangement according to the invention produces a switch-off signal that can be used, for example, in an externally provided video compression encoder for switching off the inverse 3:2 pull-down conversion. In this way the arrangement according to the invention is not only suitable for recognizing a transition from an NTSC signal obtained from film scanning to a "normal" NTSC signal obtained from video scanning with 60 fields per second, but it can also recognize the detection of an erroneous 3:2 pull-down cycle. Furthermore, picture content strongly changing from one frame to the next can also be used for generating the pull-down switch-off signal. It is then always guaranteed that with every distortion or with strongly changing picture content the inverse 3:2 pull-down conversion is switched off. This is advantageous, because the inverse 3:2 pull-down conversion, if applied wrongly, generates large evident distortions in the video signal. Therefore, it is suitable to switch off the 3:2 pull-down conversion in case of doubt.

According to one embodiment of the invention as claimed in claim 2, the pull-down switch-off signal is either generated if the MAD value of the individual blocks summed per frame exceeds a predefined threshold, or if the quotient from the Hadamard coefficients generated per frame also exceeds a predefinable threshold within a predefinable number of pull-down four-cycles of the converted signal. For this purpose, the first and second Hadamard coefficients which are generated in blocks, it is true, are summed for a respective frame. Subsequently, from the sum of the first Hadamard coefficient of a frame and the sum of the second Hadamard coefficient of a frame, the quotient is formed i.e. the sum of the first Hadamard coefficient is divided by the sum of the second Hadamard coefficient of the frame. If this value exceeds a predefinable threshold during a predefinable number of pull-down four-cycles of the converted signal, this indicates that the fields of each frame represent different phases of motion. In its turn this points out that the NTSC signal, which was subjected to the inverse 3:2 pull-down conversion, has not arisen from film scanning, but from a video signal with 60 fields per second, which represent different phases of motion, or that the 3:2 pull-down cycle was distorted by editing.

Further embodiments of the invention as claimed in claims 3 and 4 relate to a further refined evaluation of the quotient of the summed Hadamard coefficients. Particularly the pull-down four-cycle may be considered and, advantageously, the re-evaluation of the quotient of the Hadamard coefficients may preferably be concentrated on certain predefinable positions within such a pull-down four-cycle. More particularly the positions 1, 2 or 3 within such a pull-down four-cycle are eminently suitable for recognizing the type of the NTSC signal or the kind of scanning of which this is the result. The reason for this is that the Hadamard coefficients of these frames change considerably, when the 3:2 pull-down cycle was distorted by editing, or when the video signal subjected to the inverse 3:2 pull-down technique has no longer emerged from scanning 24 frames per second, but from 60 fields, which represent different motion phases.

According to a further embodiment of the invention as claimed in claim 6 the circuits for determining the MAD values as well as the circuits for determining the Hadamard coefficients may be provided in common for an MPEG encoder and for the arrangement according to the invention. This is possible because such circuit elements are also present in MPEG encoders. These circuit elements can be used for the arrangement according to the invention, so that the additional expenditure for the arrangement according to the invention and for the generation of the pull-down switch-off signal can be kept very low.

These and other aspects of the invention are apparent from and will be elucidated with reference to the embodiments described hereinafter.

Figure 2:
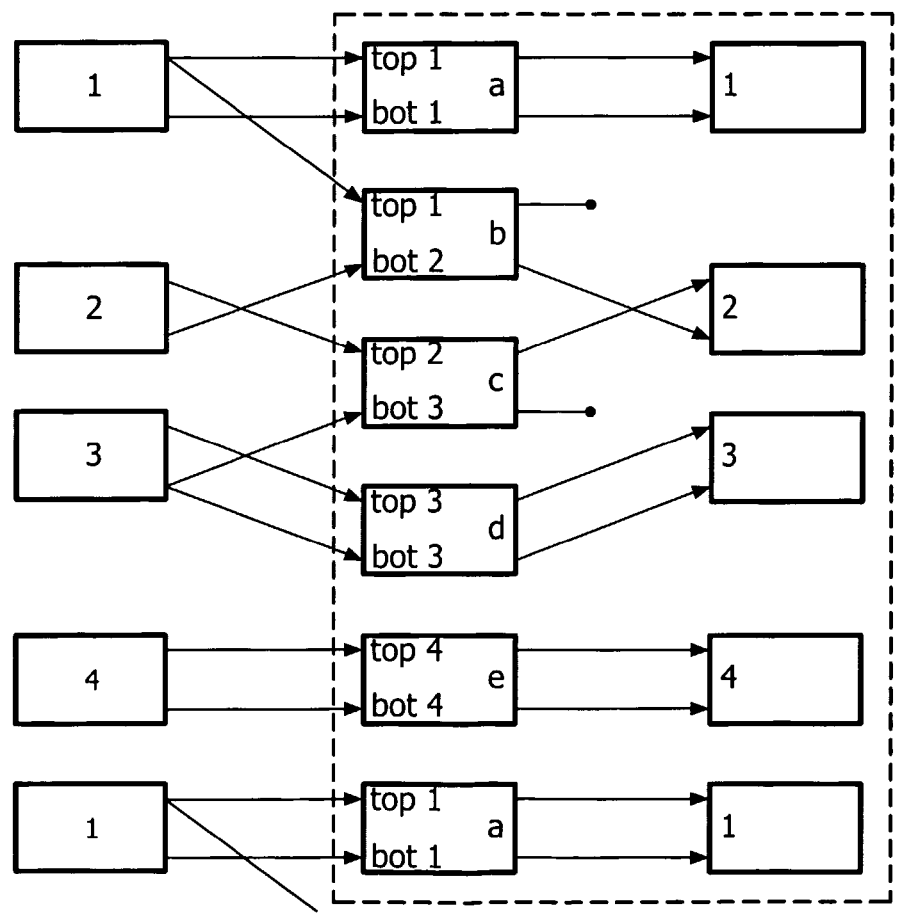
Figure 3:
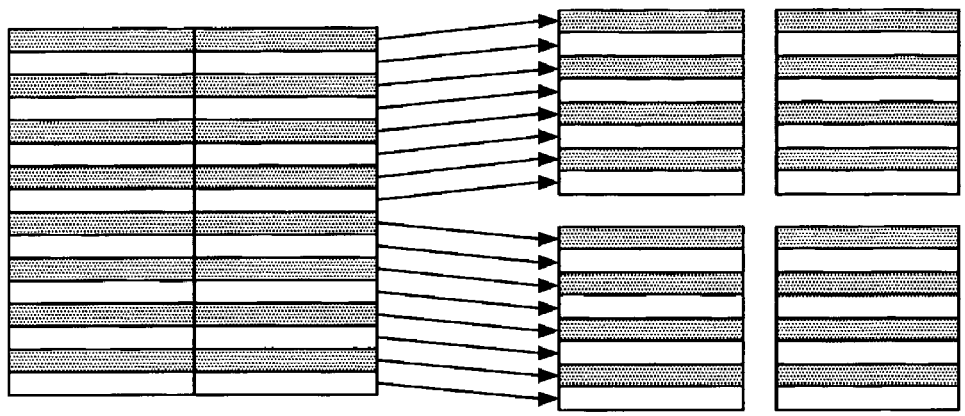
Figure 4:
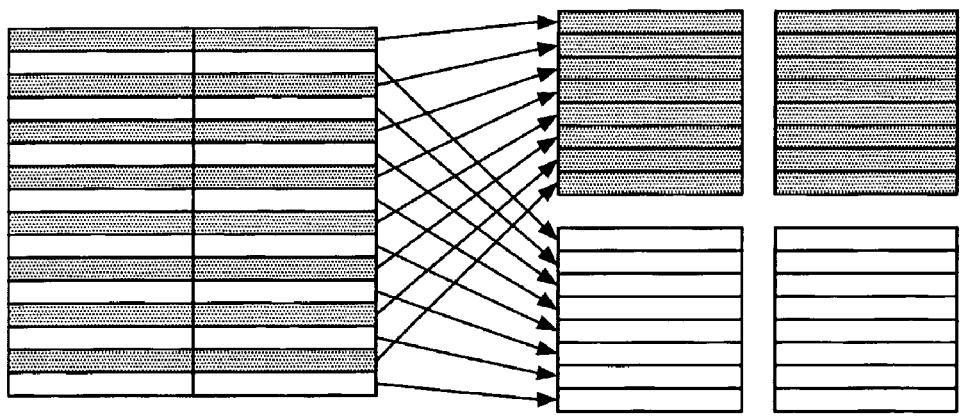

In the drawings:

FIG. 1 gives a diagrammatic representation of an inverse 3:2 pull-down conversion, FIG. 2 shows a block diagram of the arrangement according to the invention, FIG. 3 gives a diagrammatic representation of a frame whose 2 fields represent the same motion phases and FIG. 4 gives a diagrammatic representation of a frame comprising 2 fields that represent different motion phases.

As has already been explained above, an NTSC video signal, which is available with a frequency of 60 fields per second, can be recovered as a "normal" video signal by scanning 60 fields per second. Such a signal is generated, for example, by electronic cameras. The NTSC signal, however, may also be recovered by scanning a film which is available with 24 frames per second. In order to generate from the 24 frames per second not only 48 fields, but 60 fields, which an NTSC signal is to have per second, this signal may be subjected to a what-is-called 3:2 pull-down technique, in which individual fields occur several times.

For a video compression it is no use compressing the same fields several times. Therefore, it is appropriate to recognize which fields were generated several times and to exclude these fields. For this purpose a what-is-called inverse 3:2 pull-down conversion is known, which does exactly this and which again produces 24 frames in accordance with the scanned film for the purpose of video compression.

If a video compression encoder is exactly in this mode, there is a problem, however, that the video signal may include distortions, for example, from cuts or other effects, or that the NTSC signal is changed over to a signal that has been formed from 60 fields with different motion phases. In either case this inverse 3:2 pull-down conversion causes considerably distorted motion to be represented in the encoded picture, so that this case is to be avoided.

In order to eliminate this problem, the arrangement according to the invention is provided which produces a switch-off signal if there is a distortion in an NTSC signal which has been formed from the scanning of 24 frames of a film and subsequent implementation of the known 3:2 pull-down technique, so that the cycle of the 3:2 pull-down conversion is distorted or if the signal is changed over to a video signal with 60 fields of different motion phases.

In order to achieve this object, the arrangement according to the invention comprises a what-is-called Mean Absolute Distortion detector, which is generally known as MAD detector and which is used, for example, for motion detection. In the arrangement according to the invention this detector is used for generating hard cuts i.e. detecting strongly changing picture content and generating the pull-down switch-off signal. The MAD detector produces a MAD signal which indicates, prior to blocks of a certain size within a frame, the difference of the picture content of two successive frames. These MAD values generated block by block are summed for 1 frame each time and the summed values of successive frames are compared with each other. If the difference exceeds a threshold which can represent, for example, three times the mean value of the MAD values of a predefinable number of previous frames, it indicates a change of scene or a hard cut. In that case the arrangement according to the invention generates the pull-down switch-off signal, because it is always suitable with such hard cuts to check the 3:2 pull-down cycle so as to avoid any picture distortions as a result of the inverse 3:2 pull-down conversion of an input signal whose 3:2 pull-down cycle was distorted by editing, or with which a conversion from a film scanning signal to a normal video signal with 60 fields per second has taken place.

The arrangement according to the invention further includes a circuit for determining Hadamard coefficients. Hadamard coefficients are coefficients which are generated from frames block by block. A first Hadamard coefficient then takes into account the differences of the pixels of adjacent scanning lines of a frame and a second Hadamard coefficient the sum of the differences of the pixels of scanning lines i, i+2, thus of every adjacent-but-one scanning line. These Hadamard coefficients are then generated in blocks and successively summed for a frame. From the quotient of the first Hadamard coefficient divided by the second Hadamard coefficient, which will further be explained below, it may further be concluded whether the signal subjected to the inverse 3:2 pull-down conversion as before and undistorted by the 3:2 pull-down conversion has arisen from the scanning of a film with 24 frames per second. FIG. 1 gives a diagrammatic representation of the arrangement 1 according to the invention with a Mean Absolute Distortion detector 2 and a circuit 3 for determining the Hadamard coefficients.

FIG. 1 shows that the arrangement 1 according to the invention is supplied with an NTSC signal on its input, which NTSC signal was subjected to an inverse 3:2 pull-down conversion. The reason for this is that the arrangement according to the invention is then to supply a switch-off signal when an NTSC signal is subjected to an inverse 3:2 pull-down conversion in a video compression encoder not belonging to the arrangement according to the invention and the criteria for this conversion, however, are actually no longer satisfied. Thus as an initial status it is always assumed that the NTSC signal is subjected to an inverse 3:2 pull-down conversion and that criteria are searched for that point out that this conversion is to be switched off. At this very point the arrangement 1 according to the invention generates a pull-down switch-off signal referred to as P in FIG. 1.

FIG. 2 shows in a diagrammatic representation in its first column frames of an NTSC signal which has arisen from a frame scanning of a film available with 24 pictures per second. Such an NTSC signal would at first not be according to standard because it has 48 fields per second and 24 frames per second. Therefore, a what-is-called 3:2 pull-down conversion is used for these 24 frames per second, which pull-down conversion generates a standardized 60 Hz NTSC signal from the signal. This 60 Hz NTSC signal is shown in the second column of the representation in FIG. 2.

Basically, this 3:2 pull-down NTSC signal could be used for a video compression. The representation shown in FIG. 2, however, shows that individual fields of the frames of the first column show up various times in the frames of the second column. For example, already the first field of the first frame of column 1 is used both for a field of the frame A of column 2 and of the frame B of the column 2. For a video compression this means nothing more than that the same field is to be subjected to the (same) compression twice. This is inappropriate, because video compressions are always about obtaining a smallest possible data rate. Therefore, a compression of the same fields is to be avoided.

For this reason a what-is-called inverse 3:2 pull-down conversion according to the state of the art is known, which conversion generates from the 60 Hz NTSC signal as is represented in the second column of FIG. 2 again a 48 Hz frame signal in which no fields occur twice. Furthermore, with the inverse pull-down conversion it is to be heeded that the fields of the original frames of the first column in the representation as per FIG. 2, as they have emerged from the film scanning, are again correctly combined. The third column of the representation as per FIG. 2 shows the frames that have arisen from this inverse 3:2 pull-down conversion. This is again a four-cycle.

The representation as per FIG. 2 also shows that certain fields, that is the first field of frame B of the second column and the second field of frame C of the second column, are rejected because exactly these fields have arisen from double evaluation of the frames of the film scanning. The representation of FIG. 2 as a whole shows that as a result of the use of the 3:2 pull-down conversion and the consecutive inverse 3:2 pull-down conversion, again the right frames as they have originally arisen from the film scanning are combined and that also the four-cycle again arises. In this respect a video compression can take place which can work with an optimally low data rate, because no fields of the same content need to be compressed twice.

However, there is a problem if the pictures present with 60 Hz field frequency of the second column of the representation of FIG. 2 have either no longer arisen from a frame scanning of a film available with 24 frames per second, or when there is a distortion in this scanning, for example, as a result of cuts. If, for example, either the correct process of the four-cycle is no longer guaranteed, or a conversion has taken place from a film scanning signal to a normal video signal with 60 fields per second, the inverse 3:2 pull-down conversion leads to the fact that either the wrong fields are rejected, or that complete motion phases are rejected. In either case the video compression can certainly be converted again to a complete compression of all the fields of the 60 Hz signal in accordance with the second column in the representation shown in FIG. 2. This is exactly the object of the arrangement according to the invention.

By determining the MAD values and comparing the picture content of two frames, the arrangement according to the invention still goes one step further and always generates a switch-off signal when there is strongly varying picture content, which refers to a cut or distortion in the picture. As early as that will the inverse 3:2 pull-down conversion be switched off.

In addition, in accordance with the formulae $$\text{First Hadamard} = \sum_{0}^{13} \sum_{0}^{15} |in(i)(j) - in(i+1)(j)|$$

$$\text{Second Hadamard} = \sum_{0}^{13} \sum_{0}^{15} |in(i)(j) - in(i+2)(j)|$$

two Hadamard coefficients in the arrangement 3 of the representation of FIG. 1 are generated. As shown by these two equations, for thirteen scanning lines I and for fifteen pixels j the differences of pixel values are formed block-by-block. The first formula shows the generation of the first Hadamard coefficient, which sums the differences between the pixel values of scanning lines i and i+1. The second formula shows the generation of the second Hadamard coefficient which generates these differences for the pixel values of scanning lines i and i+2. These Hadamard coefficients are first generated for each frame block-by-block. They are then summed individually for each frame i.e. a sum of the first Hadamard coefficient of a frame and a sum of the second Hadamard coefficient of the same frame is generated. From these sums the quotient is determined in that the sum of the first Hadamard coefficient is divided by the sum of the second Hadamard coefficient. This quotient is then also used for generating the switch-off signal.

This is basically possible because the two Hadamard coefficients in principle indicate whether the picture differences of adjacent scanning lines or of adjacent-but-one scanning lines are larger. This can be further explained with reference to the representations of FIGS. 3 and 4. In FIG. 3 is shown in a diagrammatic form a frame that comprises 2 fields which have emerged from scanning of the same picture, for example, a film picture. In this case the first Hadamard coefficient will rather be smaller than the second Hadamard coefficient, because here the differences of the picture values increase the wider apart the scanning lines are. FIG. 4 shows in a diagrammatic representation a frame which comprises two fields which represent different motion phases. In this case the first Hadamard coefficient will rather be larger than the second coefficient, because adjacent scanning lines of the frame have resulted from various fields of different motion phases. On the other hand, the respective adjacent-but-one scanning lines of the frame have emerged from a field of a certain picture phase, thus are more likely to have slight differences of the picture values.

These connections are evaluated in the arrangement according to the invention in so far that the quotient from the summed first and second Hadamard coefficients utilizes exactly this coherence discussed with reference to FIGS. 3 and 4. Therefore, this quotient may advantageously be used for detecting an undistorted NTSC signal resulting from film scanning and be subjected to a 3:2 pull-down conversion. In an advantageous manner certain positions of the signal subjected to the four-cycle of the inverse 3:2 pull-down conversion in accordance with column 3 of the representation of FIG. 2 can be used. If, for example, an NTSC signal resulting from 24 pictures of a film is not or is no longer concerned, but the normal video signal with 60 fields of different motion phases is, the first Hadamard coefficient in frame 2 of the four-cycle will rise or fall. On the other hand, an extreme value of the quotient of the Hadamard coefficients of the frames 1 and 3 of the cycle points out that the signal that emerged from the scanning of the film was processed wrongly. Therefore, this may either be a distortion of the 3:2 pull-down conversion or a hard cut which was added to the scanned signal.

A special evaluation of the Hadamard coefficients in predefined position within the pull-down four-cycle can thus also be used for improving the detection and making it possible to generate the pull-down switch-off signal in an optimally reliable manner.

The invention claimed is:

1. An arrangement for generating a pull-down switch-off signal for a video compression encoder, which signal is determined by the arrangement in dependence on a converted signal which is produced from an NTSC signal by means of an inverse 3:2 pull-down conversion,
    wherein the circuit arrangement includes a Mean Absolute Distortion detector and a circuit for determining Hadamard coefficients,
    wherein the MAD detector produces a MAD signal which indicates for each block of predefined size the difference between the picture contents of two consecutive frames,
    wherein the circuit for determining the Hadamard coefficients delivers two coefficients in blocks per frame, from which coefficients a first coefficient indicates the sum of the differences of the pixels of adjacent scanning lines i and i+1 and a second coefficient indicates the sum of the differences of the pixels of scanning lines i and i+2, and
    wherein the pull-down switch-off signal is generated in dependence on the values of the MAD signal summed for all the blocks of a frame and in dependence on the two Hadamard coefficients summed for all the blocks of a frame.

2. An arrangement as claimed in claim 1, characterized in that the pull-down switch-off signal
    signals a switching off when the MAD value summed for each frame exceeds a predefined threshold, and/or
    signals a switching off when the quotient from the first Hadamard coefficient summed frame-by-frame and the second Hadamard coefficient summed frame-by-frame at one or more predefinable positions within a predefinable number of pull-down four-cycles of the converted signal exceeds a predefinable threshold.

3. An arrangement as claimed in claim 2, characterized in that the pull-down switch-off signal signals a switching off of the inverse 3:2 pull-down conversion when at least one predefinable position within a predefinable number of pull-down four-cycles of the converted signal the value of the quotients of the assigned Hadamard coefficients lies a predefinable value above or below the average of the summed quotients of the Hadamard coefficients of all the positions of this pull-down four-cycle.

4. An arrangement as claimed in claim 3, characterized in that the pull-down switch-off signal signals a switching off of the inverse 3:2 pull-down conversion when at one of the positions one, two or three within three consecutive cycles of the converted signal the value of the summed quotients of the assigned Hadamard coefficients lies about 10% above or below the average of the quotients of the Hadamard coefficients of all the position of this pull-down four-cycle, wherein the position two within one cycle of the converted signal represents the position whose converted frame was recovered from two different frames of the unconverted signal.

5. An arrangement as claimed in claim 1, characterized in that the pull-down switching signal signals a switching off of the inverse 3:2 pull-down conversion if the MAD signal summed frame-by-frame exceeds three times the average value from the MAD values of a predefinable number of previous frames.

6. An arrangement as claimed in claim 1, characterized in that the MAD detector and the circuit for determining the Hadamard coefficients are provided in common for the arrangement and for an MPEG encoder for which the pull-down switch-off signal is provided.

7. An arrangement as claimed in claim 1, characterized in that the pull-down switch-off signal is provided for an MPEG2 or MPEG4 encoder.

8. Use of the arrangement as claimed claim 1 in a DVD recorder.

9. A method for generating a signal, comprising:
    receiving an NTSC signal;
    processing the NTSC signal by a Mean Absolute Distortion detector to produce a MAD signal which indicates for each block of predefined size the difference between the picture contents of two consecutive frames, generating, by a circuit for determining Hadamard coefficients, two coefficients in blocks per frame, from which coefficients a first coefficient indicates the sum of the differences of the pixels of adjacent scanning lines i and i+1 and a second coefficient indicates the sum of the differences of the pixels of scanning lines i and i+2; and generating a pull-down switch-off signal based upon the values of the MAD signal summed for all the blocks of a frame and the two Hadamard coefficients summed for all the blocks of a frame.

10. The method of claim 9, wherein the pull-down switch-off signal:

signals a switching off when the MAD value summed for each frame exceeds a predefined threshold, and/or signals a switching off when the quotient from the first Hadamard coefficient summed frame-by-frame and the second Hadamard coefficient summed frame-by-frame at one or more predefinable positions within a predefinable number of pull-down four-cycles of the converted signal exceeds a predefinable threshold.

11. The method of claim 10, wherein the pull-down switch-off signal signals a switching off of an inverse 3:2 pull-down conversion when at least one predefinable position within a predefinable number of pull-down four-cycles of the converted signal the value of the quotients of the assigned Hadamard coefficients lies a predefinable value above or below the average of the summed quotients of the Hadamard coefficients of all the positions of this pull-down four-cycle.

12. The method of claim 11, wherein the pull-down switch-off signal signals a switching off of the inverse 3:2 pull-down conversion when at one of the positions one, two or three within three consecutive cycles of the converted signal the value of the summed quotients of the assigned Hadamard coefficients lies about 10% above or below the average of the quotients of the Hadamard coefficients of all the position of this pull-down four-cycle, wherein the position two within one cycle of the converted signal represents the position whose converted frame was recovered from two different frames of the unconverted signal.

13. The method of claim 9, wherein the pull-down switching signal signals a switching off of the inverse 3:2 pull-down conversion if the MAD signal summed frame-by-frame exceeds three times the average value from the MAD values of a predefinable number of previous frames.

14. The method of claim 9, wherein the MAD detector and the circuit for determining the Hadamard coefficients are provided within an MPEG encoder for which the pull-down switch-off signal is provided.

15. The method of claim 14, wherein the MPEG encoder is an MPEG2 or MPEG4 encoder.

16. The method of claim 9, wherein the method is performed by a DVD recorder.

* * * * *